United States Patent
Takemoto et al.

(10) Patent No.: US 9,307,210 B2
(45) Date of Patent: Apr. 5, 2016

(54) IMAGE OUTPUT APPARATUS, METHOD, AND MEDIUM

(71) Applicants: Ryo Takemoto, Kanagawa (JP); Ayako Watanabe, Kanagawa (JP); Shinichiro Sakamoto, Kanagawa (JP)

(72) Inventors: Ryo Takemoto, Kanagawa (JP); Ayako Watanabe, Kanagawa (JP); Shinichiro Sakamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/686,207

(22) Filed: Apr. 14, 2015

(65) Prior Publication Data

US 2015/0222865 A1     Aug. 6, 2015

Related U.S. Application Data

(63) Continuation of application No. 13/705,392, filed on Dec. 5, 2012, now Pat. No. 9,033,523.

(30) Foreign Application Priority Data

Jan. 6, 2012  (JP) .................................. 2012-001230

(51) Int. Cl.
*G03B 21/00* (2006.01)
*H04N 9/31* (2006.01)
*H04N 5/268* (2006.01)

(52) U.S. Cl.
CPC ............. *H04N 9/3179* (2013.01); *H04N 5/268* (2013.01)

(58) Field of Classification Search
CPC ........ G03B 21/00; G03B 21/14; G03B 21/16; H04N 9/3141; H04N 9/3194; H04N 9/3197
USPC ........... 353/119, 122; 345/169, 178; 358/474, 358/442, 444, 468, 497, 527; 348/189, 348/743–747, 211.99, 734, 114
See application file for complete search history.

(56) References Cited

U.S. PATENT DOCUMENTS

| 6,272,127 | B1 | 8/2001 | Golden et al. |
| 7,075,685 | B2 | 7/2006 | Chen et al. |

(Continued)

FOREIGN PATENT DOCUMENTS

| CN | 102025950 A | 4/2011 |
| CN | 102077269 A | 5/2011 |

(Continued)

OTHER PUBLICATIONS

Combined Chinese Office Action and Search Report issued Jul. 3, 2015 in Patent Application No. 201210589918.5 (with English translation of categories of cited documents).

*Primary Examiner* — Sultan Chowdhury
(74) *Attorney, Agent, or Firm* — Oblon, McClelland, Maier & Neustadt, L.L.P.

(57) ABSTRACT

The present invention provides a novel image output apparatus that includes an operation processing unit that processes an operation request from a user, a projecting unit that projects a display image from a video providing apparatus and UIs from the image projector, a determining unit that determines whether or not it is necessary to switch a source of a video signal by using a current input type and a source of a video signal with reference to a data table that associates an input type that indicates a type of a port from which an image to be projected is acquired with a source of a video signal that forms an image to be projected, and a controller that switches a source of a video signal and executes a process indicated by an operation request from a user if it is necessary to switch the source of a video signal.

10 Claims, 14 Drawing Sheets

(56) References Cited

U.S. PATENT DOCUMENTS

| | | |
|---|---|---|
| 8,439,508 B2 | 5/2013 | Matsuo et al. |
| 8,579,442 B2 | 11/2013 | Plut |
| 2004/0095562 A1 | 5/2004 | Moffatt |
| 2006/0098174 A1 | 5/2006 | Ohuchi |
| 2007/0201005 A1* | 8/2007 | Rhodes et al. .................. 353/30 |
| 2008/0204670 A1* | 8/2008 | Furui .................. H04N 9/3185 353/69 |
| 2009/0063573 A1 | 3/2009 | Takemoto |
| 2009/0237692 A1 | 9/2009 | Endoh et al. |
| 2011/0181846 A1* | 7/2011 | Ozawa ................. H04N 9/3185 353/70 |
| 2011/0299108 A1 | 12/2011 | Nagao et al. |
| 2011/0310409 A1 | 12/2011 | Yukumoto et al. |
| 2011/0317223 A1 | 12/2011 | Nagao et al. |
| 2012/0033140 A1* | 2/2012 | Xu ................................ 348/734 |
| 2012/0133970 A1 | 5/2012 | Yukumoto et al. |
| 2012/0214323 A1 | 8/2012 | Gore et al. |
| 2012/0215828 A1 | 8/2012 | Torii et al. |

FOREIGN PATENT DOCUMENTS

| | | |
|---|---|---|
| CN | 102193290 A | 9/2011 |
| WO | WO01/93583 A1 | 12/2001 |

* cited by examiner

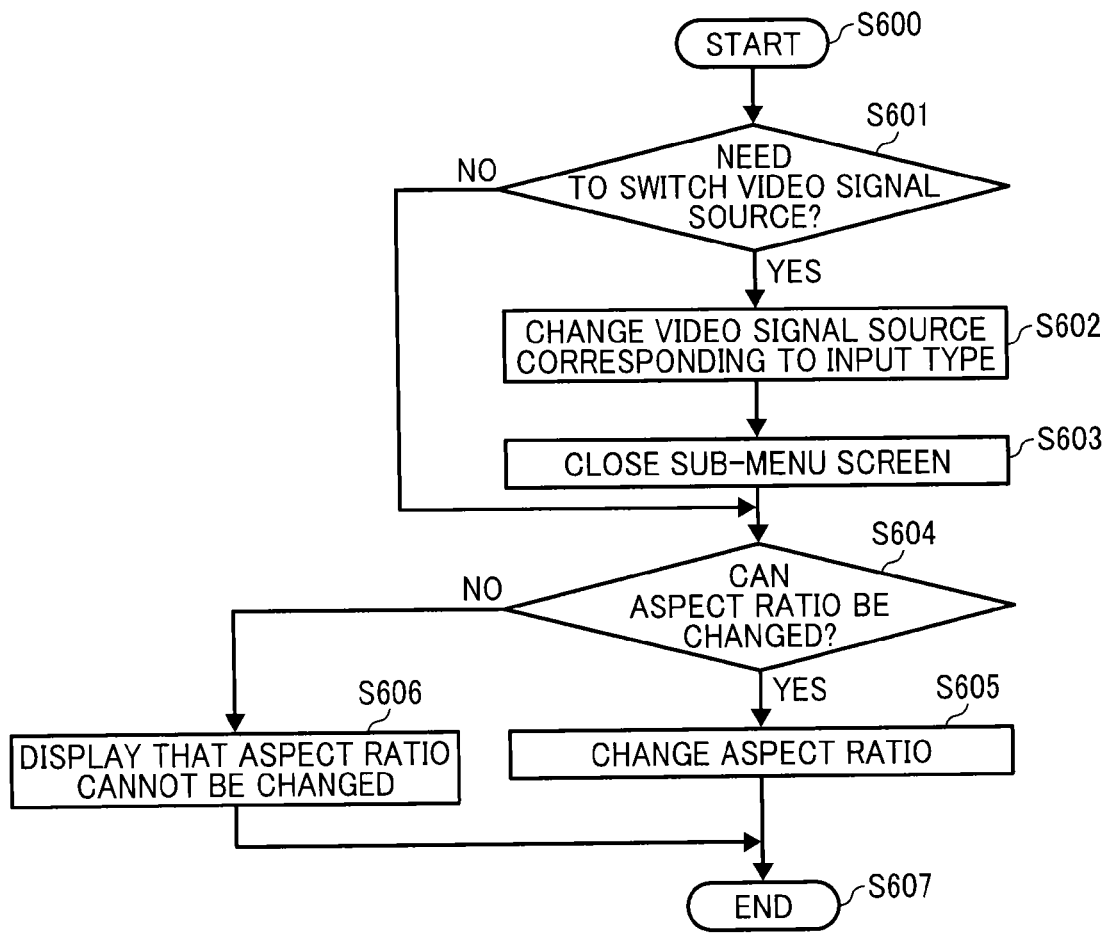

IMAGE OUTPUT APPARATUS, METHOD, AND MEDIUM

CROSS-REFERENCE TO RELATED APPLICATION

This application is a continuation of U.S. Ser. No. 13/705,392 filed Dec. 5, 2012 which claims the benefit of priority pursuant to 35 U.S.C. §119 to Japanese Patent Application No. 2012-001230, filed on Jan. 6, 2012 in the Japan Patent Office, the entire disclosure of both of which are incorporated herein by reference.

BACKGROUND OF THE INVENTION

1. Field of the Invention

The present invention relates to an image output apparatus, method, and medium, and more particularly to an image output apparatus that facilitates outputting an image provided by a video providing apparatus.

2. Description of the Background Art

Conventionally, an image projector that projects an image output by a video providing apparatus such as a personal computer (PC) onto a screen is widely used at meetings held at companies, educational institutions, government institutions, and the like.

Usually, an image projector can not only project an image output by a video providing apparatus but can also project a user interface (UI) such as a menu screen that enables a user to request the image projector to handle various operations and allows the user to request a desired operation.

Thus, an image projector that determines whether or not it is projecting image data and projects a menu screen as a UI along with the image data onto a screen if it is currently projecting image data to enable the user to request various operations using the menu screen has been proposed (e.g., JP-4186465-B).

However, while the image projector allows the user to choose a file to be acquired from a server connected to a network using the menu screen and project the file, some operation requests, such as changing the aspect ratio of a projected image, cannot be executed while projecting a UI.

SUMMARY OF THE INVENTION

The present invention provides a novel image output apparatus, method, and medium that can execute an operation request from a user even if the image projector is projecting a UI such as a menu screen.

More specifically, the present invention provides an image projector that includes an operation processing unit that processes an operation request from a user, a projecting unit that projects a display image from a video providing apparatus and UIs from the image projector, a determining unit that determines whether or not it is necessary to switch a source of a video signal by using a current input type and a source of a video signal with reference to a data table that associates an input type that indicates a type of a port from which an image to be projected is acquired with a source of a video signal that forms an image to be projected, and a controller that switches a source of a video signal and executes a process indicated by an operation request from a user in case it is necessary to switch the source of a video signal.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

FIG. 6 is a flowchart illustrating a process executed by the image projector as an embodiment of the present invention.

FIG. 7 is a diagram illustrating a data table that associates input types and source of a video signals as an embodiment of the present invention.

DETAILED DESCRIPTION OF THE INVENTION

Figure 1:
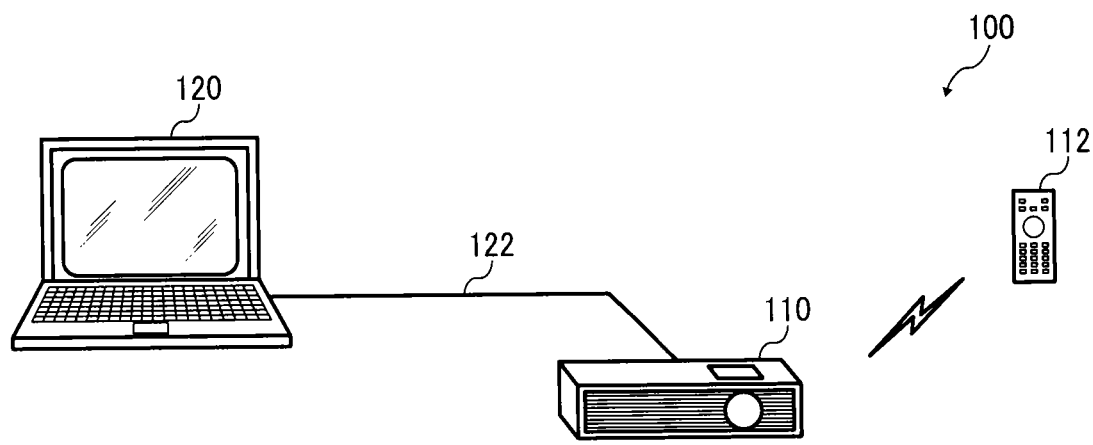
FIG. 1 is a diagram illustrating an image projecting system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings.

FIG. 1 is a diagram illustrating an image projecting system 100. In this embodiment, the image projecting system 100 includes an image projector 110 and a video providing apparatus 120, and the image projector 110 and the video providing apparatus 120 are connected with each other via a cable 122. The image projector 110 is an image output apparatus that projects an image provided by the video providing apparatus 120 onto a screen or the like. The image projector 110 projects a menu screen with which a user can specify various operations along with an image provided by the video providing apparatus 120. The image projector 110 receives operation requests from a remote control device 112 and processes various operations that execute functions implemented by the image projector 110.

In this embodiment, the image projector 110 includes video input ports such as a Video Graphics Array (VGA) port like a D-Sub connector, a High-Definition Multimedia Interface (HDMI) port, a S-video port, and a RCA port as interfaces that accepts a video signal, and receives a video signal from the video providing apparatus 120 via the cable 122 connected to those ports. Alternatively, the image projector 110 may also be configured to receive a video signal from the video providing apparatus 120 by using wireless communication compatible with wireless communication protocols such as Bluetooth and WiFi.

The video providing apparatus 120 provides images to be projected by the image projector 110. The video providing apparatus 120 includes an interface that outputs a video signal, and sends a video signal that forms a display image of the video providing apparatus 120 to the image projector 110 at a predefined transfer rate (e.g., from 30 frames per second (fps) to 60 fps).

The video providing apparatus 120 in this embodiment includes video output ports such as a VGA port, a HDMI port, a S-video port, and a RCA port as interfaces that output a video signal, and sends the video signal to the image projector 110 via the cable 122 connected to those ports. Alternatively, the video providing apparatus 120 may also send a video signal to the image projector 110 by using wireless communication compatible with wireless communication protocols such as Bluetooth and WiFi.

While a laptop PC is adopted as the video providing apparatus 120 in the embodiment shown in FIG. 1, an information processing apparatus such as a desktop PC, a tablet PC, and a PDA that can provide a video signal can be adopted in other embodiments. Also, although one video providing apparatus 120 is connected to the image projector 110 in the embodiment shown in FIG. 1, two or more video providing apparatuses can be connected to the image projector 110 in this invention.

Figure 2:
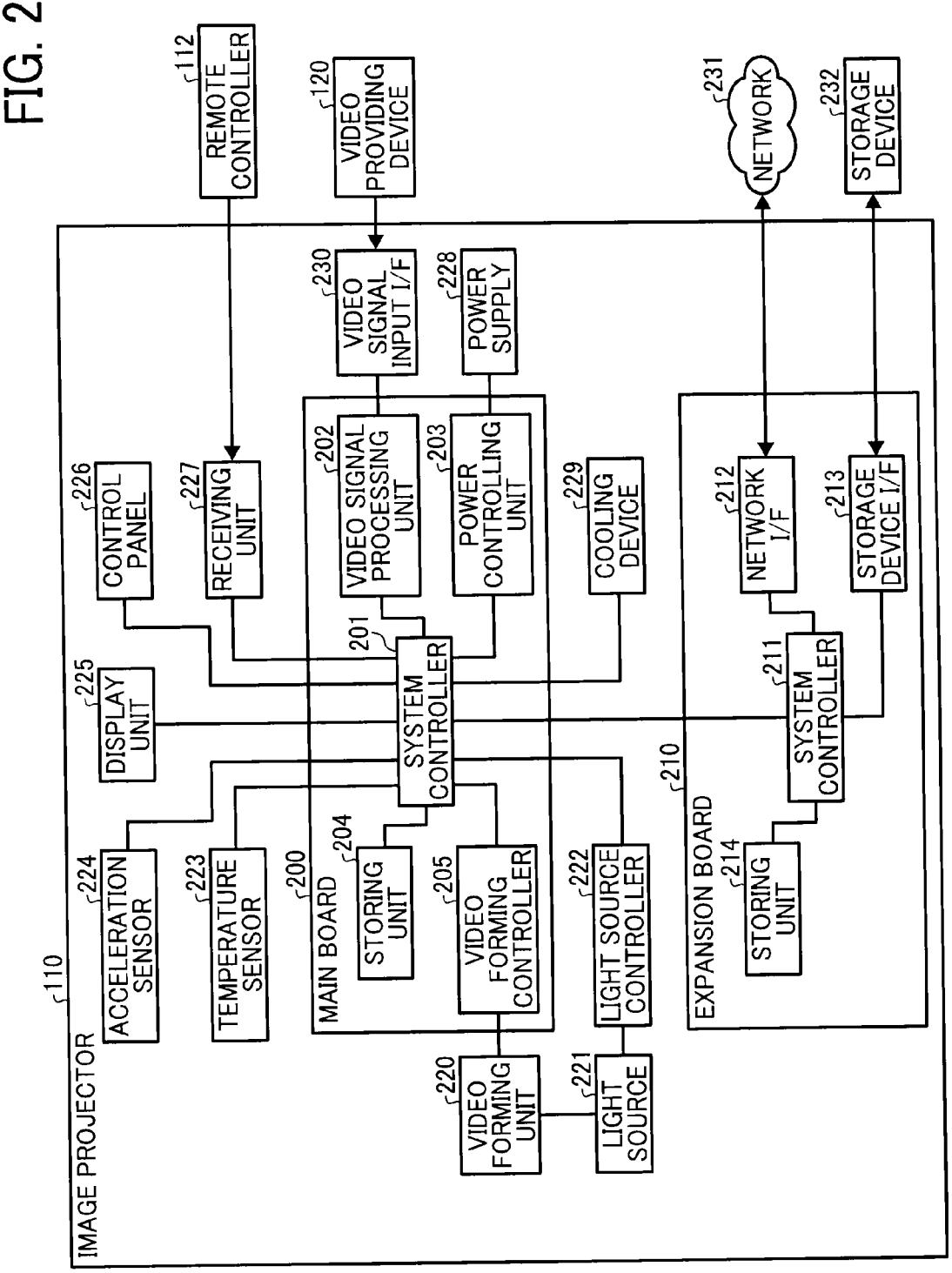
FIG. 2 is a block diagram illustrating a hardware configuration of an image projector as an embodiment of the present invention.

FIG. 2 is a diagram illustrating a hardware configuration of an image projector in this embodiment. The image projector 110 includes a main board 200, an expansion board 210, a video forming unit 220, a light source 221, a light source controller 222, a power source 228, and a video signal input interface 230.

The main board 200 is a printed-circuit board that includes functional units that control the whole of the image projector 110. The main board 200 includes a system controller 201, a video signal processing unit 202, a power source controller 203, a storing unit 204, and a video forming controller 205, and can be comprised of an integrated circuit such as an Application Specific Integrated Circuit (ASIC) that implements the functional units described above.

The system controller 201 is a functional unit that controls the image projector 110 as a whole. The system controller 201 is connected to the video signal processing unit 202, the power source controller 203, the storing unit 204, and the video forming controller 205 via a bus, and controls each functional unit.

The video signal processing unit 202 is a functional unit that processes a video signal provided by the video providing apparatus 120. The video signal processing unit 202 receives a video signal via the video signal input interface 230, and executes various processes such as serial-parallel conversion and voltage level conversion on the input video signal.

The power source controller 203 is a functional unit that controls the power source 228 that supplies power to the image projector 110. The power source controller 203 turns the power of the power source 228 on and off.

The storing unit 204 is non-volatile memory that stores various data processed by the system controller 201. The storing unit 204 can be implemented by adopting various non-volatile memory devices such as EPROM, EEPROM, and flash memory.

The video forming controller 205 is a functional unit that controls the video forming unit 220 that forms video. The video forming controller 205 provides image data generated by the system controller 201 to the video forming unit 220 and forms video of the image data. The video forming unit 220 forms video of the image data and projects the image data onto a screen or the like by illuminating light generated by the light source 221 to the video forming unit 220. If the image projector 110 is a liquid crystal projector, a liquid crystal can be adopted as the video forming unit 220. If the image projector 110 is a Digital Light Processing (DLP) projector, a Digital Micro-mirror Device (DMD) and a color wheel can be adopted as the video forming unit 220.

The light source controller 222 is a functional unit that controls the light source 221 and adjusts the amount of light of the light source 221 under the control of the system controller 201. A lamp such as a high-pressure mercury lamp can be used as the light source 221.

The expansion board 210 is a printed-circuit board that includes functional units that control communication via a network and an external storage device. The expansion board 210 includes a system controller 211, a network interface 212, a storage device interface 213, and a storing unit 214, and can be comprised of an integrated circuit such as an Application Specific Integrated Circuit (ASIC) that implements the functional units described above.

The system controller 211 is a functional unit that controls a storage device 232 and communication via a network 231. The system controller 211 is connected to the network interface 212, the storage device interface 213, and the storing unit 214 via a bus.

The network interface 212 is a functional unit that communicates data via the network 231. The network interface 212 provides data received from the network 231 to the system controller 211 and sends data received from the system controller 211 to the network 231. The network interface 212 includes a port that can be connected to a network cable such as a LAN cable and executes wired communication via the network cable. Also, the network interface 212 includes wireless communication functions such as Bluetooth and WiFi and can communicate data by wireless communication.

The storage device interface 213 is an interface that connects a portable storage device 232 such as USB memory. The storage device interface 213 acquires image data such as still images and moving images and provides the image data to the system controller 211.

The storage device 214 is a non-volatile memory that stores various data processed by the system controller 211. The storage device 214 can be implemented as EPROM, EEPROM, or flash memory.

The image projector 110 includes a temperature sensor 223, an acceleration sensor 224, a display unit 225, a control panel 226, a receiving unit 227, and a cooling unit 229, and these functional units are connected to the system controller 201 via a bus.

The temperature sensor 223 is a unit that detects temperature inside the image projector 110. The temperature sensor 223 notifies the system controller 201 of the detected temperature.

The acceleration sensor 224 is a unit that detects acceleration of the image projector 110. The acceleration sensor 224 notifies the system controller 201 of the detected acceleration.

The display unit 225 is a unit that provides a user with various information by display and is comprised of LED indicators and a liquid crystal panel. The display unit 225 displays information to be displayed that is received from the system controller 201 on the LED indicators and the liquid crystal panel.

The control panel 226 is a functional unit that accepts various operation requests from a user and is comprised of devices such as keys and buttons located on the outside surface of the image projector 110. Operation requests include a request to change aspect ratio of a projected image, turning the image projector off, changing lamp power to change the amount of light of the light source, switching input to switch a video providing apparatus whose display image is to be projected in case a plurality of video providing apparatuses are connected to the image projector 110, changing video mode to change quality of projected video (e.g., high-brightness, standard, and natural), freezing to stop projected video, switching an input type that indicates a type of a port from which image to be projected is acquired, displaying a main menu screen or a sub-menu screen, a request to change aspect ratio, and closing the sub-menu screen. After accepting an operation request from a user, the control panel 226 notifies the system controller 201 of the accepted operation request.

The receiving unit 227 is a functional unit that receives an operation signal from the remote control device 112. After receiving the operation signal, the receiving unit 227 notifies the system controller of the received operation signal.

The cooling unit 229 is a unit that cools the image projector 110 and is comprised of devices such as a cooling fan. The cooling unit 229 is driven under the control of the system controller 201 and cools the image projector 110 down.

Figure 3:
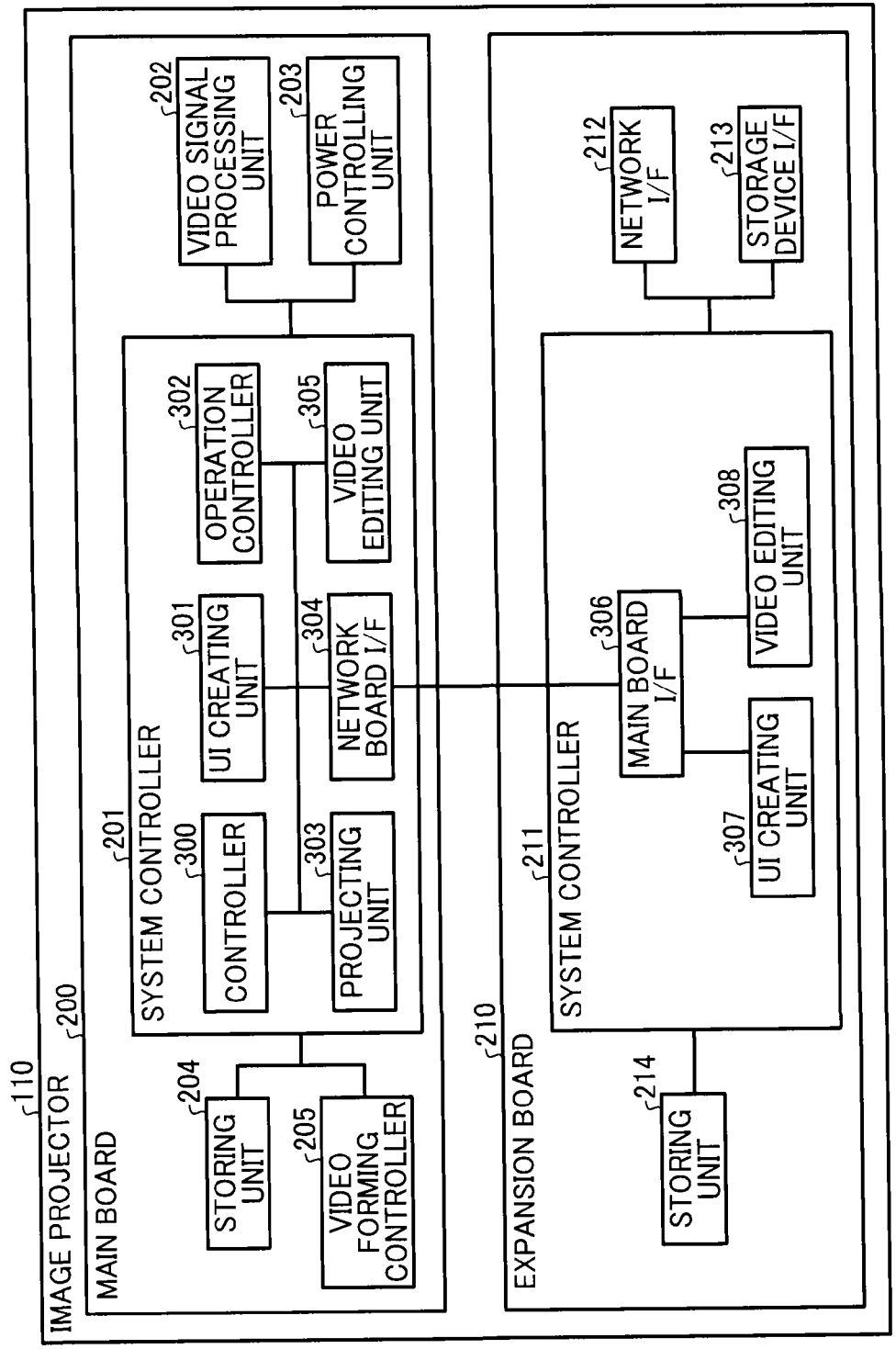
FIG. 3 is a functional block diagram illustrating a functional configuration of a main board and an expansion board included in the image projector as an embodiment of the present invention.

FIG. 3 is a diagram illustrating a functional configuration of the main board 200 and the expansion board 210 included in the image projector 110 of this embodiment. The functional configuration of the system controller 201 on the main board 200 and the system controller 211 on the expansion board 210 is described below.

The system controller 201 includes a controlling unit 300, a UI creating unit 301, an operation controlling unit 302, a projecting unit 303, a network board interface 304, and a video editing unit 305.

The controlling unit 300 is a functional unit that controls the whole of the system controller 201. The controlling unit 300 controls other functional units included in the system controller 201 and functional units described above.

The UI creating unit 301 is a functional unit that creates UIs such as a menu screen generated by the main board 200 (hereinafter referred to as "main menu screen"), a dialog box, a message window, an icon, and a help menu. The UI creating unit 301 reads menu setting information to be displayed on a main menu screen from the storing unit 204 and creates the main menu screen that reflects the menu setting information. The UI creating unit 301 sends a video signal that forms the main menu screen to the projecting unit 303. The main menu screen created by the UI creating unit 301 will be described in detail later with reference to FIG. 15.

The operation controller 302 accepts various operation requests from the control panel 226 and the remote control device 112 and notifies a functional unit corresponding to the operation request of the operation request.

The projecting unit 303 is a functional unit that projects image data by controlling the video forming controller 205. The projecting unit 303 sends a video signal that forms an image received from the video providing unit 120, a video signal that forms the main menu screen acquired from the UI creating unit 301, and a video signal that forms the sub-menu screen acquired from the expansion board 210 to the video forming controller 205, and has the video forming controller 205 project these image data.

The network board interface 304 is an interface that executes data communication between the main board 200 and the expansion board 210. The network board interface 304 sends requests to display the sub-menu screen and close the sub-menu screen to the expansion board 210 and receives a response signal to these requests and a video signal that forms the sub-menu screen from the expansion board 210.

The video editing unit 305 is a functional unit that edits image data. The video editing unit 305 executes editing processes such as changing the aspect ratio of image data to be projected, sends the edited image data to the projecting unit 303, and has the projecting unit 303 project the edited image data.

The system controller 211 includes a main board interface 306, an UI creating unit 307, and a video editing unit 308.

The main board interface 306 is an interface that executes data communication between the main board 200 and the expansion board 210. After receiving requests to display the sub-menu screen and close the sub-menu screen from the main board 200, the main board interface 306 notifies the UI creating unit 307 and sends a response signal to the main board 200.

The UI creating unit 307 is a functional unit that creates a menu screen as an UI generated by the expansion board 210 (hereinafter referred to as "sub-menu screen"). The UI creating unit 307 reads menu setting information to be displayed on a sub-menu screen from the storing unit 214 and creates the sub-menu screen that reflects the menu setting information. The UI creating unit 307 sends a video signal that forms the sub-menu screen to the main board 200 via the main board interface 306. The sub-menu screen created by the UI creating unit 307 will be described in detail later with reference to FIG. 15.

The video editing unit 308 is a functional unit that edits image data acquired from the network 231 or the storage device 232. The video editing unit 308 sends the edited image data to the main board 200 via the main board interface 306.

A program that implements the functional units described above can be stored in machine-readable storage devices such as a hard disk drive (HDD), a CD-ROM, a MO, a flexible disk, EEPROM, and EPROM and distributed. The program can also be transmitted in machine-readable format via a network.

Figure 4:
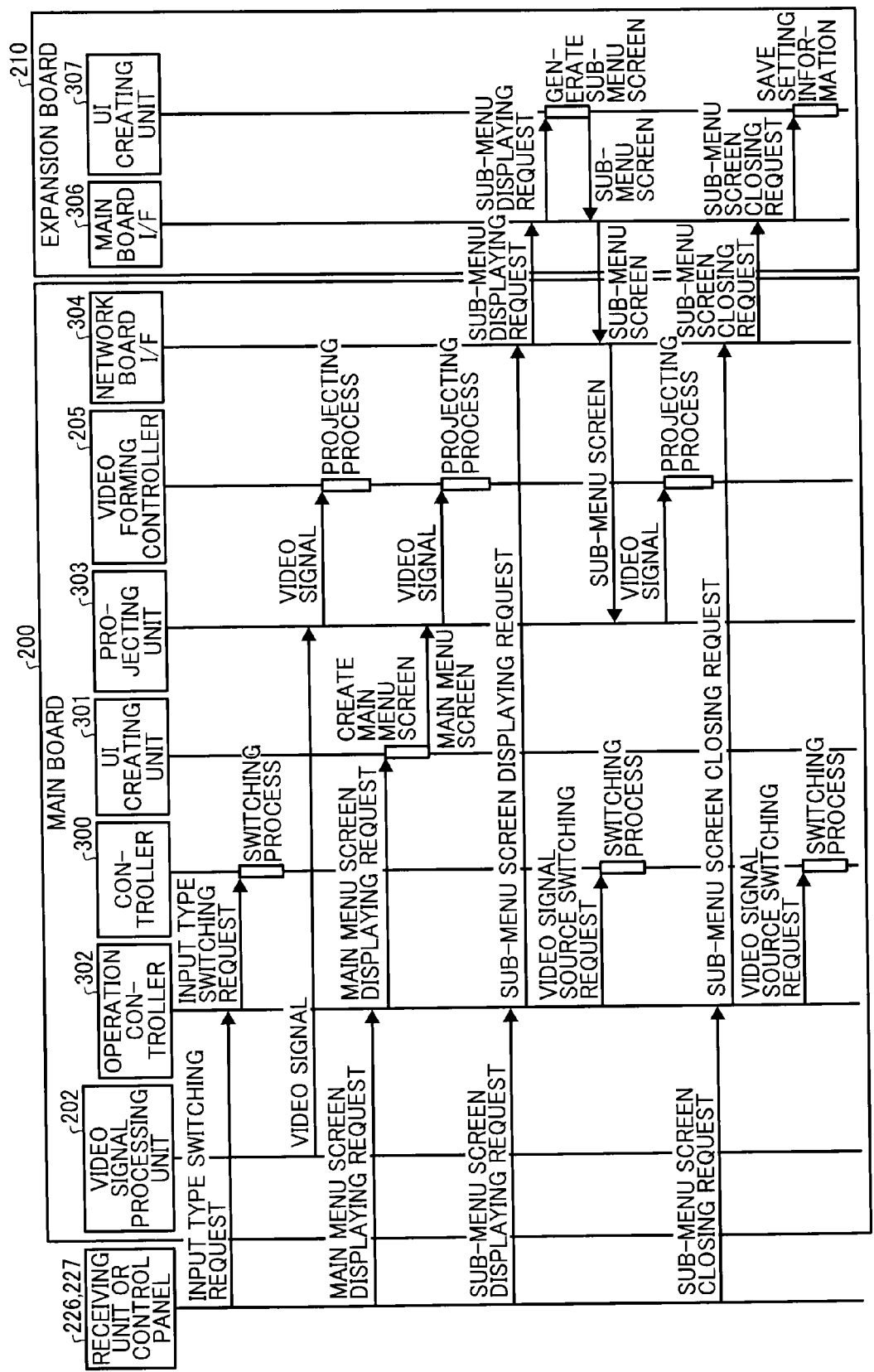
FIG. 4 is a sequence diagram illustrating a process executed by the image projector as an embodiment of the present invention.

FIG. 4 is a sequence diagram illustrating a process executed by the image projector 110 in this embodiment. Process sequence when the image projector 110 receives operation requests such as switching input type, displaying the main menu, and displaying the sub-menu and process sequence when the image projector 110 receives a video signal are described below with reference to FIG. 4.

If a user requests to switch input type by using the control panel 226 or the remote control device 112, the control panel 226 or the receiving unit 227 notifies the operation controller 302 of the switching request. After receiving the request of switching input type, the operation controller 302 notifies the controller 300 of the request of switching input type.

After referring to a data table (described later with reference to FIG. 7) that associates an input type that indicates the type of port from which an image to be projected is acquired with a source of a video signal that forms an image to be projected, the controller 300 switches a source of a video signal to a source of a video signal that corresponds to an input type specified by the user. Therefore, source of a video signal to be projected by the image projector 110 is switched to the source of a video signal that corresponds to the input type specified by the user.

The controller 300 stores information that indicates the input type specified by the user and information that indicates the source of the video signal that forms the video projected by the image projector to the storing unit 204.

If the image projector 110 receives a video signal from the video providing device 120, the video signal processing unit 202 sends the video signal to the projecting unit 303. After the projecting unit 303 sends the video signal to the video forming controller 205, the video forming controller 205 forms video by using the video signal and has the video forming unit 220 project the image displayed by the video providing device 120.

If a user requests to display the main menu screen by using the control panel 226 or the remote control device 112, the control panel 226 or the receiving unit 227 notifies the operation controller 302 on the main board 200 of the display request. After receiving request of displaying the main menu, the operation controller 302 notifies the UI creating unit 301 of the request of displaying the main menu screen. After acquiring menu setting information from the storing unit 204, the UI creating unit 301 creates the main menu screen that reflects the menu setting information and sends it to the projecting unit 303. The projecting unit 303 sends the video signal that forms the main menu screen to the video forming controller 205, and the video forming controller 205 sends the video signal to the video forming unit 220 and has the video forming unit 220 project the main menu screen.

If a user requests to display the sub-menu screen by using the control panel 226 or the remote control device 112, the control panel 226 or the receiving unit 227 notifies the operation controller 302 on the main board 200 of the display request. After receiving the request of displaying the sub-menu, the operation controller 302 notifies the main board interface 306 on the expansion board 210 of the request of displaying the sub-menu screen via the network board interface 304.

After receiving the request of displaying the sub-menu screen, the main board interface 306 notifies the UI creating unit 307 of the request of displaying the sub-menu screen. After acquiring menu setting information from the storing unit 214, the UI creating unit 307 creates the sub-menu screen that reflects the menu setting information, and sends it to the network board interface 304 on the main board 200 via the main board interface 306. The network board interface 304 send the sub-menu screen to the projecting unit 303, and the projecting unit 303 sends a video signal that forms the sub-menu screen to the video forming controller 205. Subsequently, the video forming controller 205 sends the video signal to the video forming unit 220 and has the video forming unit 220 project the sub-menu screen.

Next, the operation controller 302 sends a request of switching a source of a video signal to the controller 300. The controller 300 switches the source of the video signal to the expansion board 210. Consequently, since the source of video to be projected by the image projector 110 is switched to the expansion board 210, the image projector 110 projects the sub-menu screen created by the expansion board 210. The operation controller 302 stores information that indicates the source of the video signal before projecting the sub-menu screen and information that indicates the expansion board as the source of the video signal after switching to the storing unit 204.

If a user requests to close the sub-menu screen by using the control panel 226 or the remote control device 112, the control panel 226 or the receiving unit 227 notifies the operation controller 302 on the main board 200 of the request. After receiving the request of closing the sub-menu screen, the operation controller 302 notifies the main board interface 306 on the expansion board 210 of the request via the network board interface 304.

After receiving the request of closing the sub-menu screen, the main board interface 306 notifies the UI creating unit 307 of the request of closing the sub-menu screen. The UI creating unit 307 stores the menu setting information displayed on the sub-menu screen to the storing unit 214, and stops providing the sub-menu screen to the main board 200.

Next, the operation controller 302 sends a request of switching a source of a video signal to the controller 300. After referring to information that indicates the source of the video signal before projecting the sub-menu screen stored in the storing unit 204, the controller 300 switches the source of the video signal to the source of the video signal before displaying the sub-menu screen. Consequently, since the source of video to be projected by the image projector 110 is switched to the source of the video signal before displaying the sub-menu screen, the image projector 110 projects video projected before displaying the sub-menu screen again. The controller 300 stores information that indicates the expansion board as the source of the video signal to the storing unit 204.

Figure 5:
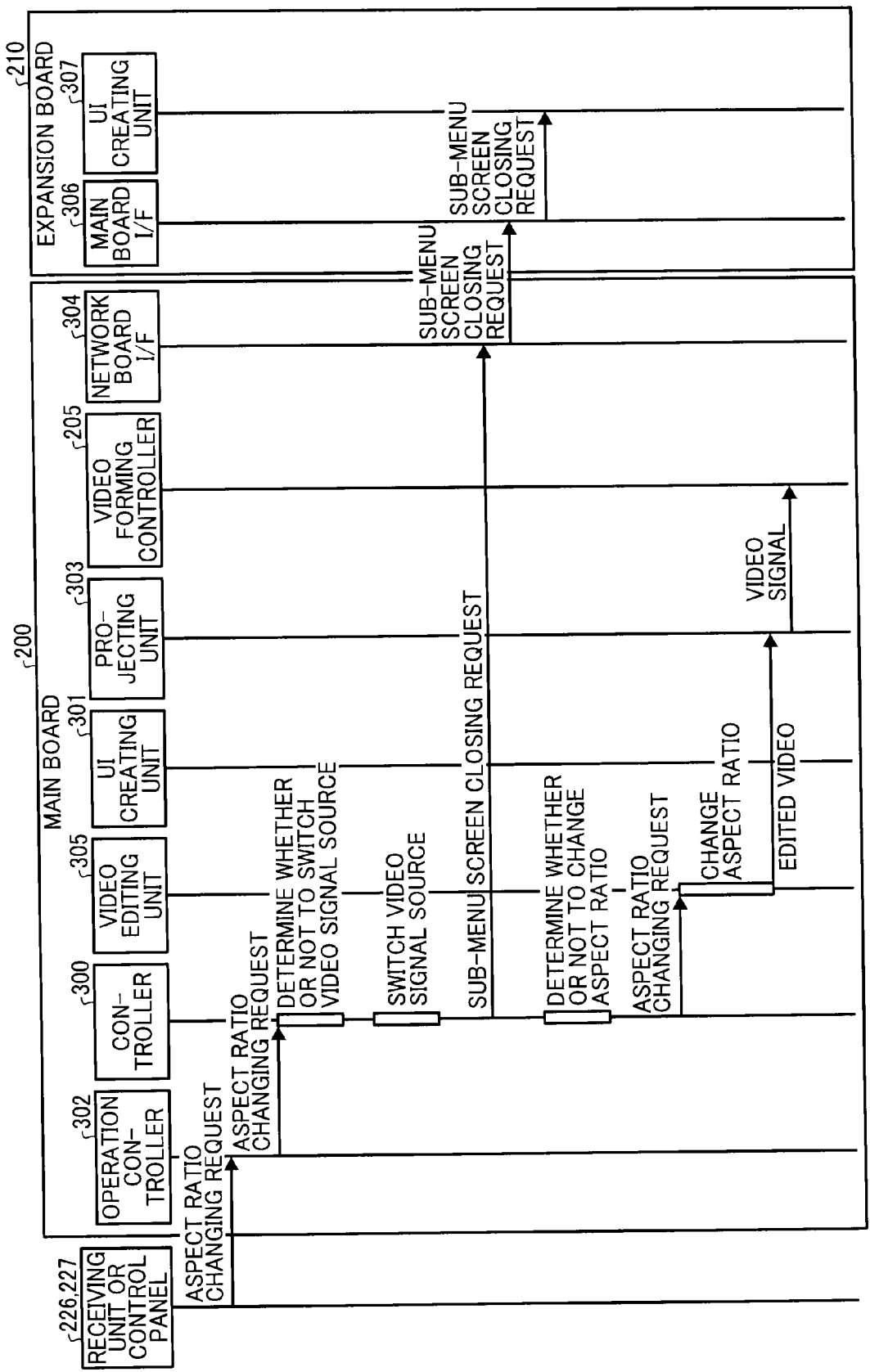
FIG. 5 is a sequence diagram illustrating a process executed by the image projector as an embodiment of the present invention.

FIG. 5 is a sequence diagram illustrating a process executed by the image projector 110 in this embodiment. Process sequence when the image projector 110 receives an operation request that requests to change aspect ratio is described below with reference to FIG. 5. It should be noted that the image projector 110 can process other operation requests. The request to change aspect ratio is taken as an example of an operation request.

If a user requests to change aspect ratio by using the control panel 226 or the remote control device 112, the control panel 226 or the receiving unit 227 notifies the operation controller 302 of the change request. After receiving the request to change aspect ratio, the operation controller 302 notifies the controller 300 of the request to change aspect ratio.

The controller 300 determines whether or not it is necessary to switch a source of a video signal. If the controller 300 determines that it is necessary to switch the source of the video signal, after referring to information that indicates the source of the video signal before projecting the sub-menu screen stored in the storing unit 204, the controller 300 switches the source of the video signal to the source of the video signal before displaying the sub-menu screen. Subsequently, the controller 300 sends the request of closing the sub-menu screen to the main board interface 306 on the expansion board 210 via the network board interface 304. It should be noted that if the controller 300 determines it is not necessary to switch an input type, the controller 300 does not switch the input type and does not close the sub-menu screen.

After receiving the request of closing the sub-menu screen, the main board interface 306 notifies the UI creating unit 307 of the request. The UI creating unit 307 stops providing the sub-menu screen to the main board 200 without storing the menu setting information to the storing unit 214.

Next, the controller 300 determines whether or not it is possible to change aspect ratio of video currently projected. If the controller 300 determines that it is possible to change aspect ratio, the controller 300 sends the request to change aspect ratio to the video editing unit 305. After changing the aspect ratio of video currently projected, the video editing unit 305 sends the edited video to the projecting unit 303. The projecting unit 303 sends a video signal that forms the video whose aspect ratio was changed to the video forming controller 205. The video forming controller 205 sends the video signal to the video forming unit 220 and has the video forming unit 220 project the display image whose aspect ratio was changed and which is provided from the video providing device 120.

FIG. 6 is a flowchart illustrating a process executed by the image projector 110 in this embodiment. An embodiment of the process executed by the image projector 110 in case a user requests to change aspect ratio is described below with reference to FIG. 6. It should be noted that the image projector 110 can process other operation requests. The request to change aspect ratio is taken as an example of an operation request.

Process shown in FIG. 6 starts from S600. In S601, after the operation controller 302 notifies the controller 300 of a request to change aspect ratio, the controller 300 refers to a data table that associates an input type with a source of a video signal and determines whether or not it is necessary to switch a source of a video signal. More specifically, after referring to the data table, the controller 300 determines that it is necessary to switch the source of the video signal if the source of the video signal that corresponds to the input type of the image projector is different from the current source of the video signal. The data table will be described in detail later with reference to FIG. 7.

If the controller 300 determines that it is not necessary to switch the source of the video signal in S601, the process proceeds to S604. Alternatively, if the controller 300 determines that it is necessary to switch the source of the video signal (YES in S601), the process proceeds to S602.

In S602, the controller 300 acquires information that indicates a current input type from the storing unit 204, specifies the source of the video signal that corresponds to the input type with reference to the data table, and switches the source of the video signal to the specified source of the video signal. In S603, the controller 300 sends the request of closing the sub-menu screen to the UI creating unit 307 on the expansion board 210 and closes the sub-menu screen.

In S604, the controller 300 determines whether or not it is possible to change aspect ratio of video currently projected. In this embodiment, the controller 300 determines that it is possible to change aspect ratio if a video signal is received, and determines that it is not possible to change aspect ratio if a video signal is not received.

If the controller 300 determines that it is possible to change aspect ratio (YES in S604), the process proceeds to S605. In S605, after the video editing unit 305 changes aspect ratio of video currently projected, the projecting unit 303, the video forming controller 205, and the video forming unit 220 project the video, and the process finishes in S607.

Alternatively, if the controller 300 determines that it is not possible to change aspect ratio (NO in S604), the process proceeds to S606. In S606, after the UI creating unit 301 creates a UI that indicates that it is impossible to change aspect ratio, the projecting unit 303, the video forming controller 205, and the video forming unit 220 project the UI, and the process finishes in S607.

FIG. 7 is a diagram illustrating a data table that associates an input type and a source of a video signal in this embodiment. A data table 700 that associates an input type with a source of a video signal is described below with reference to FIG. 7.

An input type 710 indicates types of a port from which video to be projected is acquired. A user can choose the input type arbitrarily by using a screen of switching an input type. In this embodiment, "computer" that indicates a VGA port connected to the video providing device, "Y/Pb/Pr" that indicates a Y/Pb/Pr port, "HDMI" that indicates a HDMI port, "video" that indicates a video cable port, "USB memory" that indicates a USB port, and "network" that indicates a LAN port are used as input types.

A source of a video signal 720 is a source of a video signal that forms video to be projected by the main board 200. In this embodiment, "computer" that indicates a destination of the VGA cable or the Y/Pb/Pr cable, "HDMI" that indicates a destination of the HDMI cable, "video" that indicates a destination of the video cable, and "expansion board" that indicates the expansion board 210 are used as sources of video signals.

If the main menu screen is superimposed on a display image of the video providing device 120 or the target image, the image projector 110 stores information that indicates the computer as a video providing device is the source of the video signal. Alternatively, if the sub-menu screen is projected, the image projector 110 stores information that indicates the expansion board 210 that creates and provides the sub-menu screen is the source of the video signal.

Figure 8:
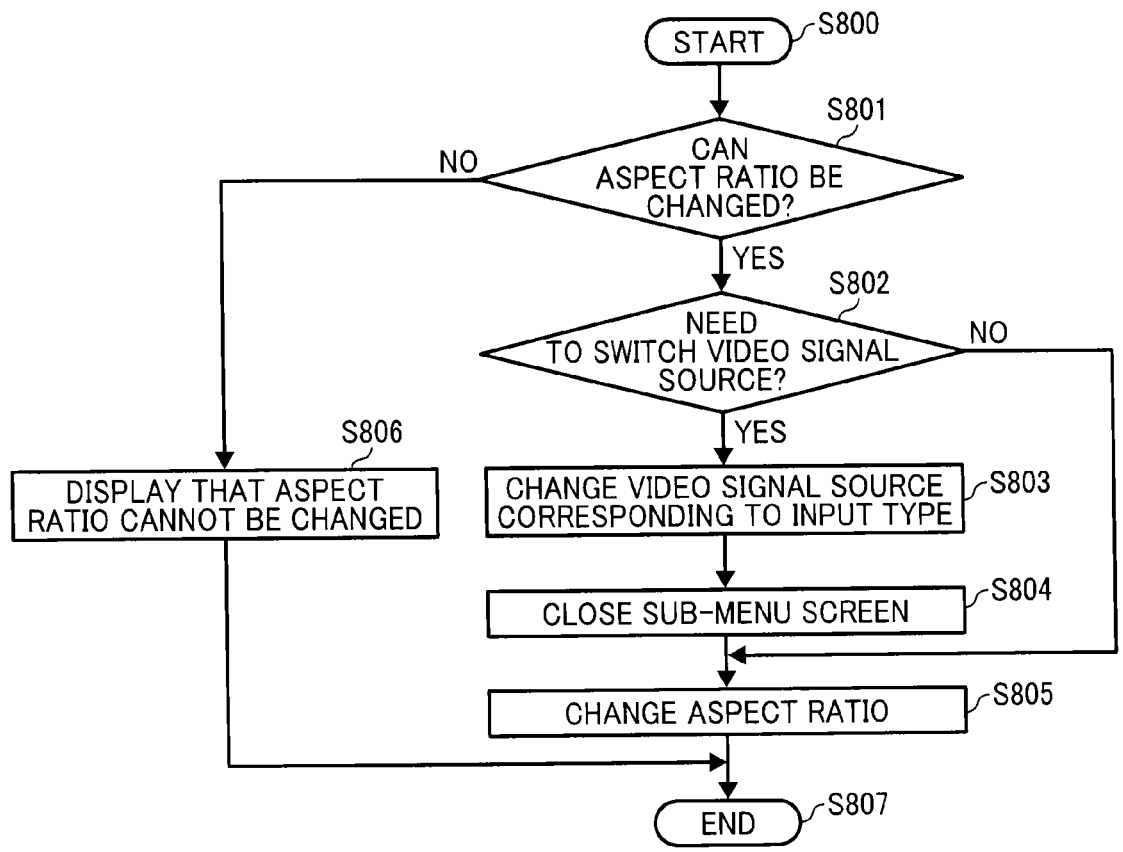
FIG. 8 is a flowchart illustrating a process executed by the image projector as an embodiment of the present invention.

FIG. 8 is a flowchart illustrating a process executed by the image projector in this embodiment. Another embodiment of a process executed by the image projector 110 in case a user requests to change aspect ratio is described below with reference to FIG. 8. It should be noted that the image projector 110 can process other operation requests while the request to change aspect ratio is being processed.

Process shown in FIG. 8 starts from S800. In S801, the operation controller 302 notifies the controller 300 of a request to change aspect ratio, and the controller 300 determines whether or not it is possible to change aspect ratio of video currently projected. If it is possible to change aspect ratio (YES in S801), the process proceeds to S802. In S802, the controller 300 determines whether or not it is necessary to switch a source of a video signal with reference to the data table that associates input types with sources of video signals.

If the controller 300 determines that it is necessary to switch the source of the video signal (YES in S802), the process proceeds to S803. In S803, the controller 300 acquires information that indicates the current input type, specifies the source of the video signal that corresponds to the input type with reference to the data table, and switches the source of the video signal to the specified source of the video signal. In S804, the controller 300 sends a request to close the sub-menu screen to the UI creating unit 307 on the expansion board 210, and the sub-menu screen is closed.

Alternatively, if the controller determines that it is not necessary to switch the source of the video signal (NO in S802), the process proceeds to S805.

In S805, after the video editing unit 305 changes aspect ratio of video currently projected, the projecting unit 303, video forming controller 205, and the video forming unit 220 project the video, and the process finishes in S607.

Alternatively, if the controller 300 determines that it is not possible to change aspect ratio (NO in S801), the process proceeds to S806. In S806, after the UI creating unit 301 creates a UI that indicates that it is impossible to change aspect ratio, the projecting unit 303, the video forming controller 205, and the video forming unit 220 project the UI, and the process finishes in S807. In this case, if the sub-menu screen is projected, the UI and the sub-menu screen are superimposed and projected by the projecting unit 303, the video forming controller 205, and the video forming unit 220.

Figure 9:
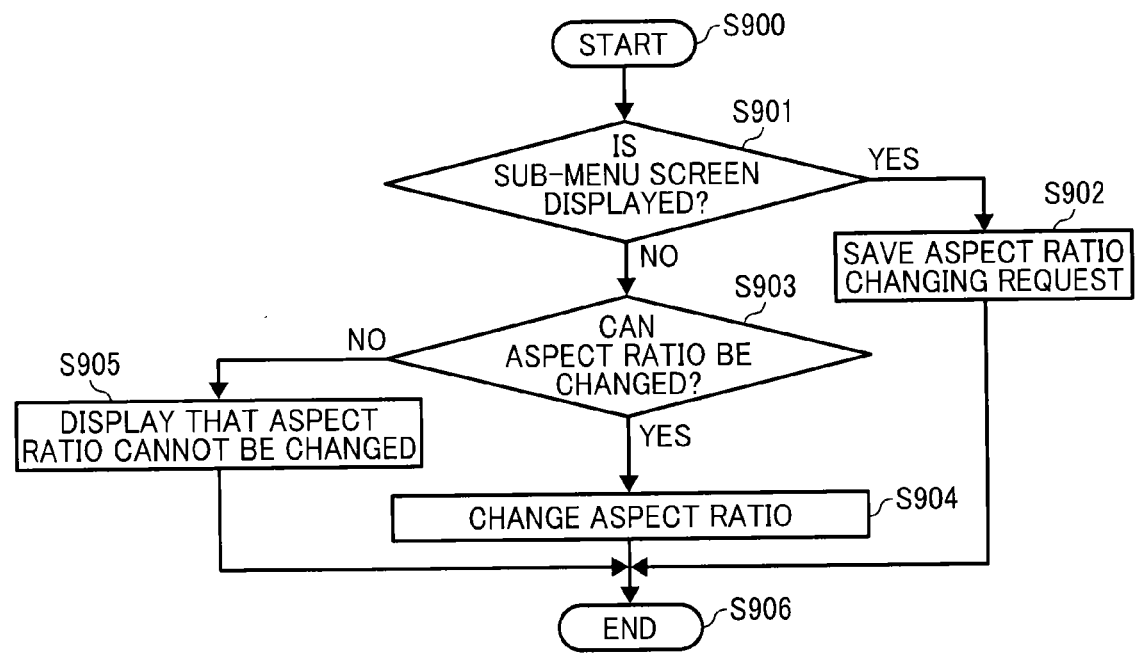
FIG. 9 is a flowchart illustrating a process executed by the image projector as an embodiment of the present invention.

FIG. 9 is a flowchart illustrating a process executed by the image projector 110 in this embodiment. Another embodiment of a process executed by the image projector 110 in case a user requests to change aspect ratio is described below with reference to FIG. 9. It should be noted that the image projector 110 can process other operation requests while the request to change aspect ratio is being processed.

Process shown in FIG. 9 starts from S900. In S901, the operation controller 302 notifies the controller 300 of a request to change aspect ratio, and the controller 300 determines whether or not the sub-menu screen is currently displayed. In this embodiment, the controller 300 can determine whether or not the sub-menu screen is currently displayed by detecting whether or not the controller 300 receives a video signal that forms the sub-menu screen from the expansion board 210.

If the controller 300 determines that the sub-menu screen is currently displayed (YES in S901), the process proceeds to S902. In S902, the controller 300 stores the request to change aspect ratio to the storing unit 204, and the process finishes in S906.

If the controller 300 determines that the sub-menu screen is not currently displayed (NO in S901), the process proceeds to S903. In S903, the controller 300 determines whether or not it is possible to change aspect ratio of video currently projected. If the controller 300 determines that it is possible to change aspect ratio (YES in S903), the process proceeds to S904. In S904, after the video editing unit 305 changes aspect ratio of video currently projected, the projecting unit 303, video forming controller 205, and the video forming unit 220 project the video, and the process finishes in S906.

Alternatively If the controller 300 determines that it is impossible to change aspect ratio (NO in S903), the process proceeds to S905. In S905, after the UI creating unit 301 creates a UI that indicates that it is impossible to change aspect ratio, the projecting unit 303, the video forming controller 205, and the video forming unit 220 project the UI, and the process finishes in S906.

Figure 10:
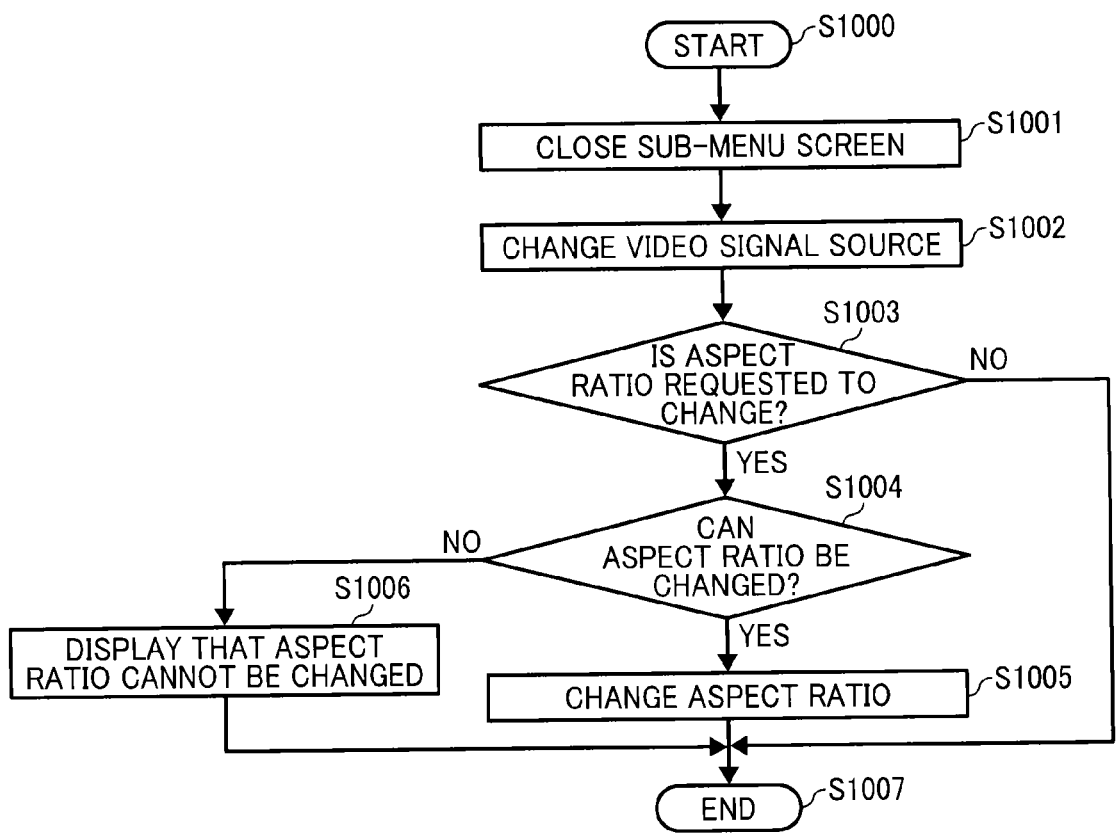
FIG. 10 is a flowchart illustrating a process executed by the image projector that executes the process shown in FIG. 9 as an embodiment of the present invention.

FIG. 10 is a flowchart illustrating a process shown in FIG. 9 and executed by the image projector 110 in this embodiment. A process executed by the image projector 110 if a user requests to close the sub-menu screen is described below with reference to FIG. 10.

Process shown in FIG. 10 starts from S1000. In S1001, after the operation controller 302 notifies the controller 300 of a request of closing the sub-menu screen, the controller 300 sends the request of closing the sub-menu screen to the UI creating unit 307 on the expansion board 210, and the sub-menu screen is closed. In S1002, after acquiring information that indicates the input type before displaying the sub-menu screen from the storing unit 204, the controller 300 specifies the source of the video signal that corresponds to the input type with reference to the data table and switches the source of the video signal to the specified source of the video signal.

In S1003, the controller 300 determines whether or not it is requested to change aspect ratio with reference to the storing unit 204. If it is not requested to change aspect ratio (NO in S1003), the process proceeds to S1007 and ends.

Alternatively, if it is requested to change aspect ratio (YES in S1003), the process proceeds to S1004. In S1004, the controller 300 determines whether or not it is possible to change aspect ratio of video currently projected. If it is possible to change aspect ratio (YES in S1004), the process proceeds to S1005. In S1005, after the video editing unit 305 changes aspect ratio of video currently projected, the projecting unit 303, video forming controller 205, and the video forming unit 220 project the video, and the process finishes in S1007.

Alternatively, if it is impossible to change aspect ratio (NO in S1004), the process proceeds to S1006. In S1006, after the UI creating unit 301 creates a UI that indicates that it is impossible to change aspect ratio, the projecting unit 303, the video forming controller 205, and the video forming unit 220 project the UI, and the process finishes in S1007.

Figure 11:
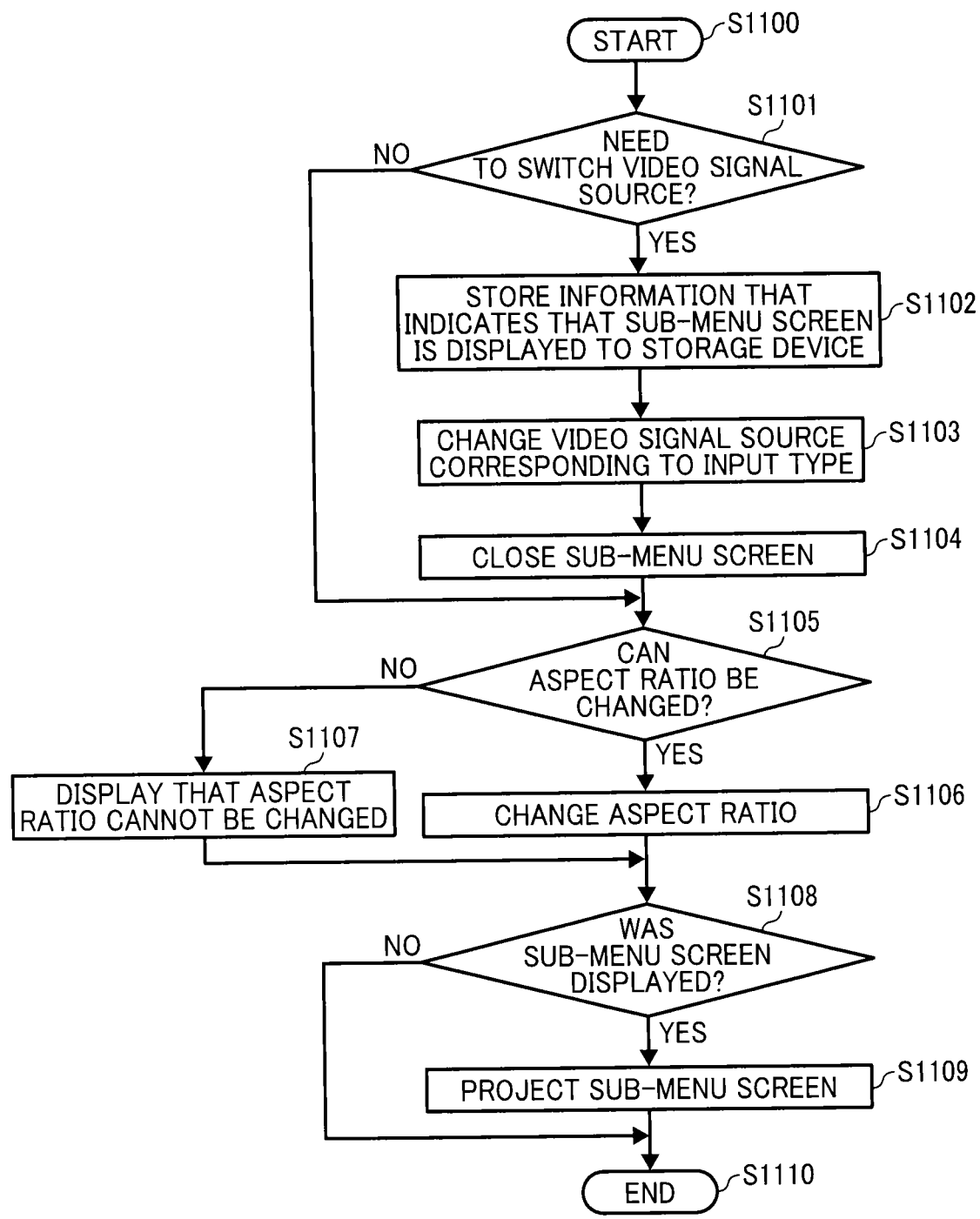
FIG. 11 is a flowchart illustrating a process executed by the image projector as an embodiment of the present invention.

FIG. 11 is a flowchart illustrating a process executed by the image projector 110 in this embodiment. Another embodiment of a process executed by the image projector 110 in case a user requests to change aspect ratio is described below with reference to FIG. 11. It should be noted that the image projector 110 can process other operation requests while the request to change aspect ratio is being processed.

Process shown in FIG. 11 starts from S1100. In S1101, after the operation controller 302 notifies the controller 300 of a request to change aspect ratio, the controller 300 refers to the data table that associates input types with sources of video signals and determines whether or not it is necessary to switch the source of the video signal.

If the controller 300 determines that it is necessary to switch the source of the video signal (YES in S1101), the process proceeds to S1102. In S1102, the controller 300 stores information that indicates the sub-menu screen was displayed to the storing unit 204. In S1103, the controller 300 acquires information that indicates the current input type from the storing unit 204, specifies the source of the video signal that corresponds to the input type with reference to the data table, and switches the source of the video signal to the specified source of the video signal. In S1104, the controller 300 sends the request of closing the sub-menu screen to the UI creating unit 307 on the expansion board 210 and the sub-menu screen is closed.

Alternatively, if the controller 300 determines that it is not necessary to switch source of a video signal (NO in S1101), the process proceeds to S1105. In S1105, the controller 300 determines whether or not it is possible to change aspect ratio of video currently projected. If the controller 300 determines that it is possible to change aspect ratio (YES in S1105), the process proceeds to S1106. In S1106, after the video editing unit 305 changes aspect ratio of video currently projected, the projecting unit 303, the video forming controller 205, and the video forming unit 220 project the video.

Alternatively, if the controller 300 determines that it is not possible to change aspect ratio (NO in S1105), the process proceeds to S1107. In S1107, after the UI creating unit 301 creates a UI that indicates that it is impossible to change aspect ratio, the projecting unit 303, the video forming controller 205, and the video forming unit 220 project the UI.

In S1108, the controller 300 determines whether or not the sub-menu screen was displayed by referring to the storing unit 204 and determines whether or not information that indicates that the sub-menu screen was displayed exists. If the sub-menu was displayed (YES in S1108), the process proceeds to S1109). In 1109, the controller 300 sends a request of displaying the sub-menu screen to the expansion board 210 and has it create the sub-menu screen, and the projecting unit 303, the video forming controller 205, and the video forming unit 220 project the sub-menu screen.

Alternatively, if the sub-menu screen was not displayed (NO in S1108), the process proceeds to S1110 and ends.

Figure 12:
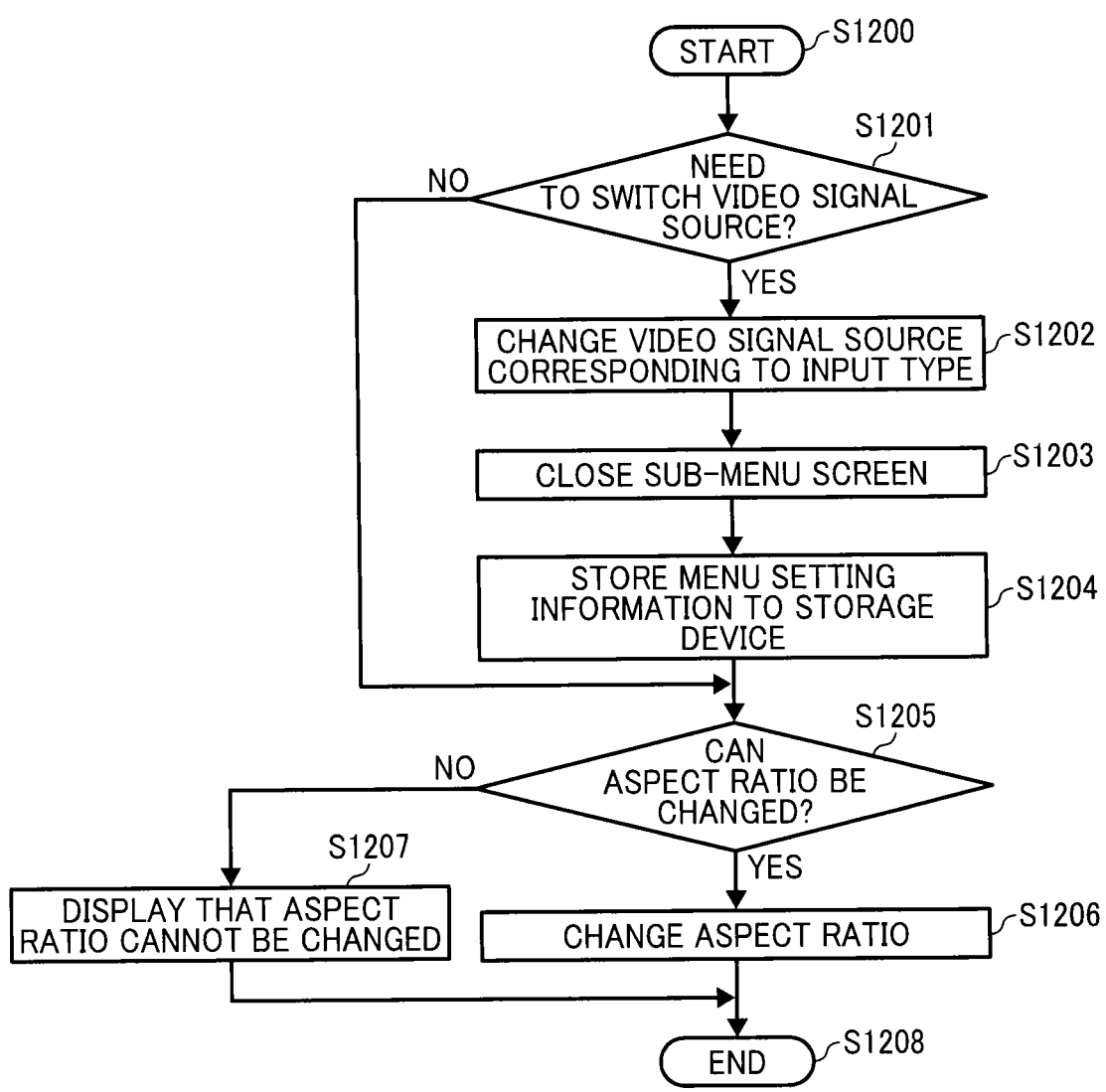
FIG. 12 is a flowchart illustrating a process executed by the image projector as an embodiment of the present invention.

FIG. 12 is a flowchart illustrating a process executed by the image projector 110 in this embodiment. Another embodiment of a process executed by the image projector 110 in case a user requests to change aspect ratio is described below with reference to FIG. 12. It should be noted that the image projector 110 can process other operation requests while the request to change aspect ratio is being processed.

Process shown in FIG. 12 starts from S1200. In S1201, after the operation controller 302 notifies the controller 300 of a request to change aspect ratio, the controller 300 refers to the data table that associates input types with sources of video signals and determines whether or not it is necessary to switch the source of the video signal.

If the controller 300 determines that it is necessary to switch source of a video signal (YES in S1201), the process proceeds to S1202. In S1202, the controller 300 acquires information that indicates the current input type from the storing unit 204, specifies the source of the video signal that corresponds to the input type with reference to the data table, and switches the source of the video signal to the specified source of the video signal. In S1203, the controller 300 sends a request of closing the sub-menu screen to the UI creating unit 307 on the expansion board 210 and the sub-menu screen is closed. In S1204, the UI creating unit 307 stores the menu setting information displayed on the sub-menu screen to the storing unit 214.

Alternatively, if the controller 300 determines that it is not necessary to switch source of a video signal (NO in S1201), the process proceeds to S1205. In S1205, the controller 300 determines whether or not it is possible to change aspect ratio of video currently projected. If it is possible to change aspect ratio (YES in S1205), the process proceeds to S1206. In S1206, after the video editing unit 305 changes aspect ratio of video currently projected, the projecting unit 303, the video forming controller 205, and the video forming unit 220 project the video, and the process finishes in S1208.

Alternatively, if the controller 300 determines that it is not possible to change aspect ratio (NO in S1205), the process proceeds to S1207. In S1207, after the UI creating unit 301 creates a UI that indicates that it is impossible to change aspect ratio, the projecting unit 303, the video forming controller 205, and the video forming unit 220 project the UI, and the process finishes in S1208.

Figure 13:
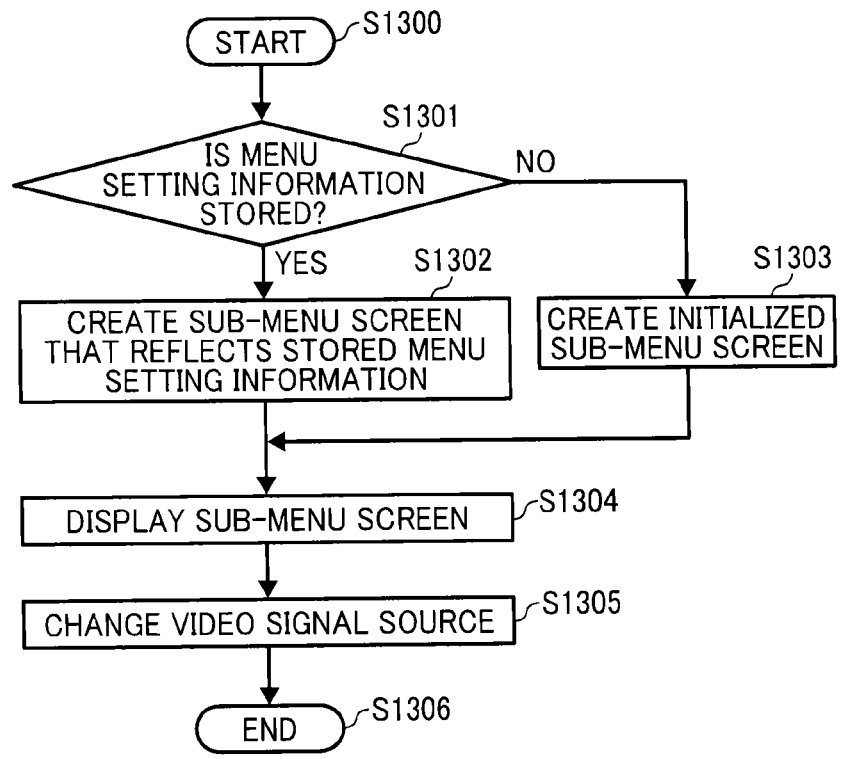
FIG. 13 is a flowchart illustrating a process executed by the image projector that executes the process shown in FIG. 12 as an embodiment of the present invention.

FIG. 13 is a flowchart illustrating a process executed by the image projector 110 when the image projector 110 executes the process shown in FIG. 12 in this embodiment. A process executed by the image projector 110 if a user requests to display the sub-menu screen is described below with reference to FIG. 13.

Process shown in FIG. 13 starts from S1300. In S1301, the operation controller 302 notifies the expansion board 210 of a request of displaying the sub-menu screen via the network board interface 304. Subsequently, the UI creating unit 307 on the expansion board 210 determines whether or not menu setting information is stored with reference to the storing unit 214.

If the menu setting information is not stored (NO in S1301), the UI creating unit 307 creates an initialized sub-menu screen and sends it to the projecting unit 303 in the main board 200. Alternatively, if the menu setting information is stored (YES in S1301), the process proceeds to S1302. In S1302, the UI creating unit 307 creates the sub-menu screen that reflects the menu setting information and sends it to the projecting unit 303 in the main board 200.

In S1304, the projecting unit 303, the video forming controller 205, and the video forming unit 220 project the sub-menu screen. In S1305, the controller 300 switches the source of the video signal to the expansion board that provides the sub-menu screen, and the process finishes in S1306.

Figure 14:
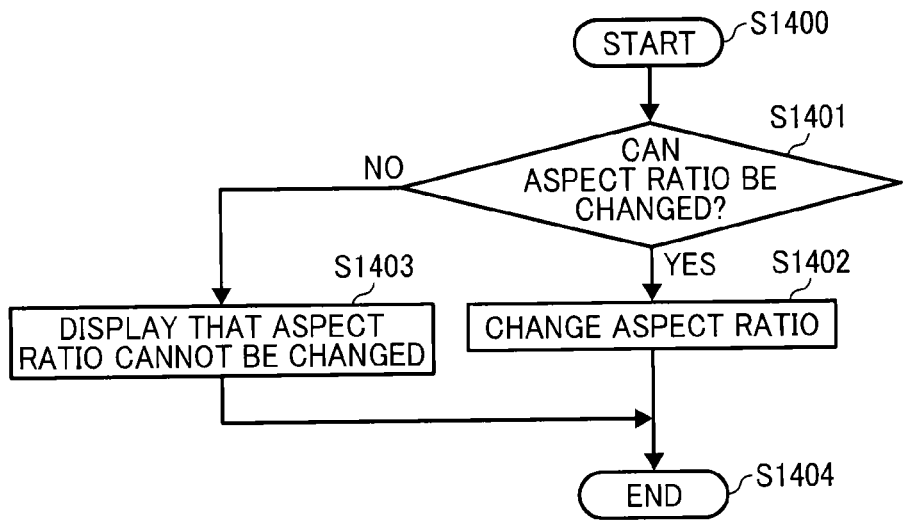
FIG. 14 is a flowchart illustrating a process executed by the image projector as an embodiment of the present invention.
Figure 15A:
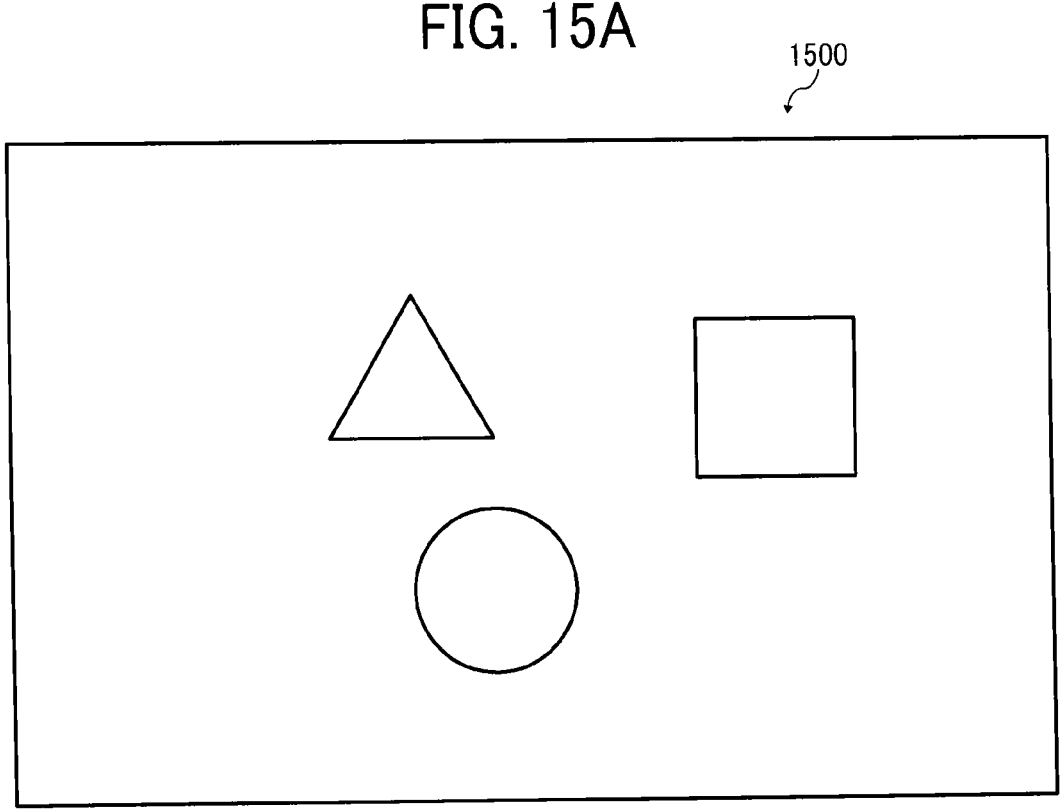
FIGS. 15A, 15B, 15C, and 15D are diagrams illustrating an example of images projected by the image projector as an embodiment of the present invention.
Figure 15B:
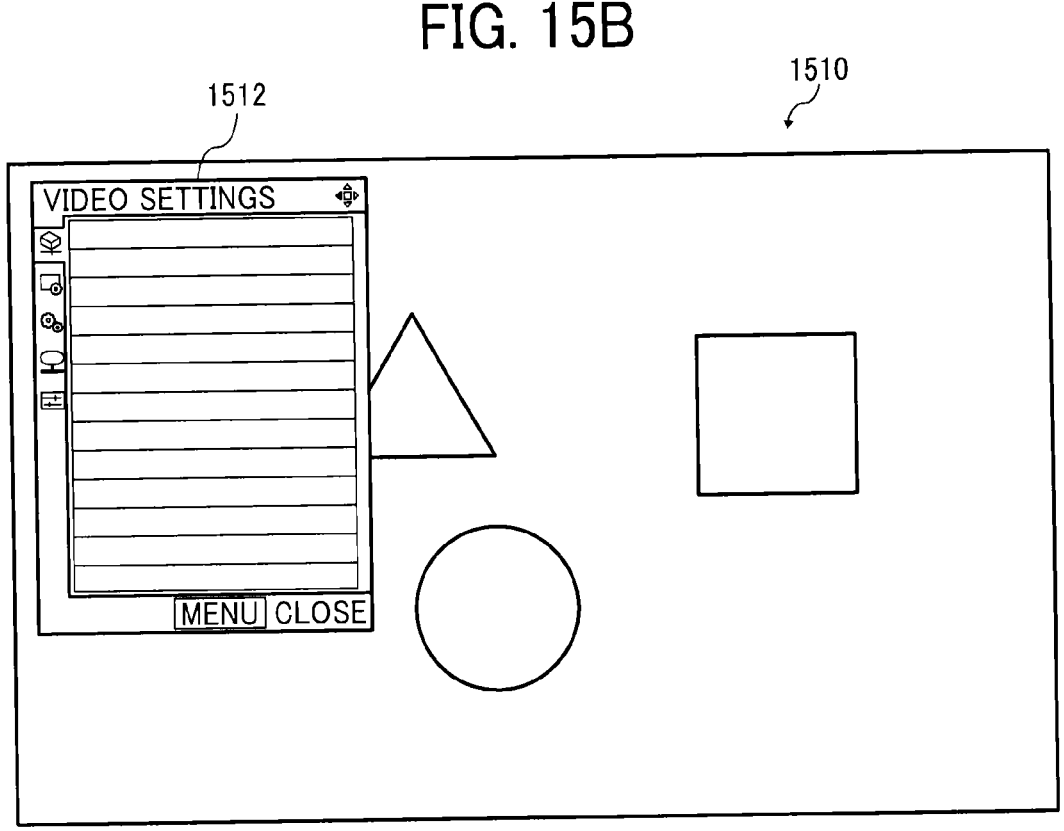
Figure 15C:
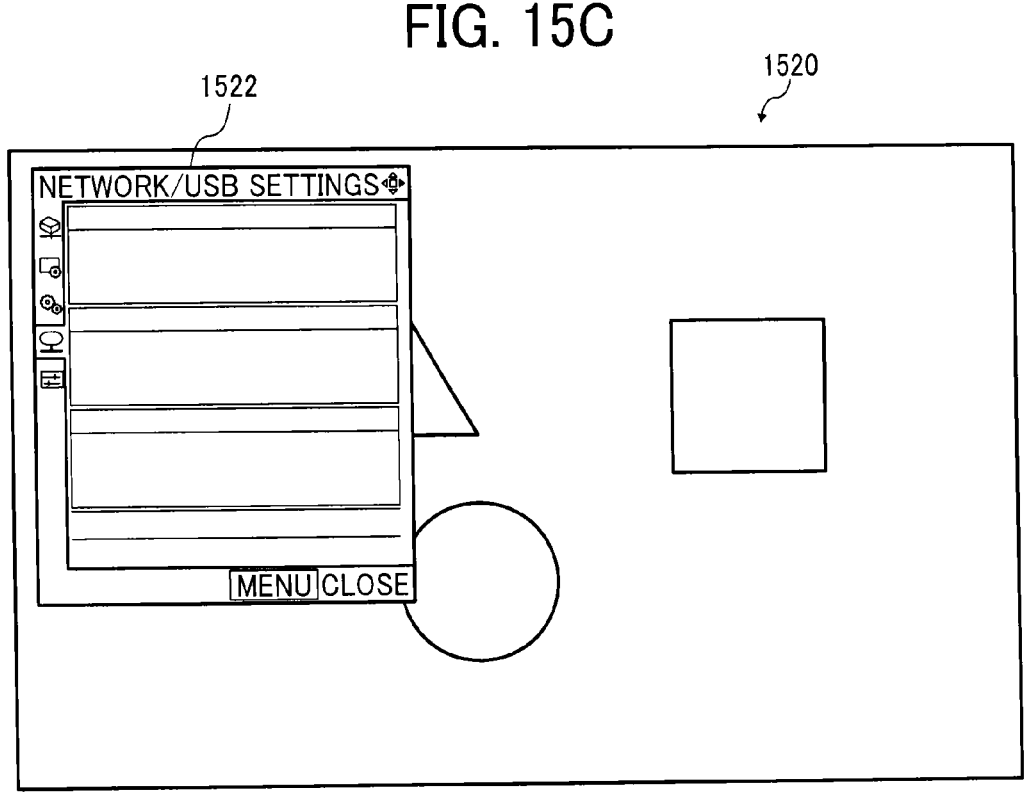
Figure 15D:
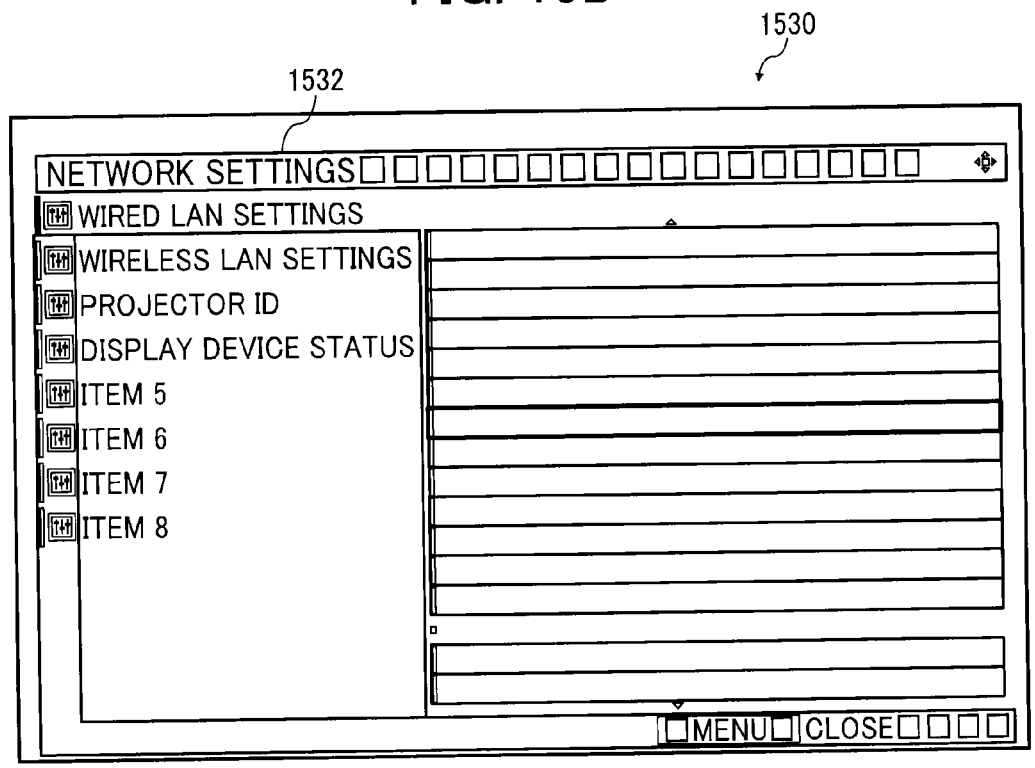

FIG. 14 is a flowchart illustrating a process executed by the image projector 110 in this embodiment. Another embodiment of a process executed by the image projector 110 if a user requests to change aspect ratio is described below with reference to FIG. 14. It should be noted that the image projector 110 can process other operation requests while the request to change aspect is being processed.

Process shown in FIG. 14 starts from S1400. In S1401, the operation controller 302 notifies the controller 300 of a request to change aspect ratio, and the controller 300 determines whether or not it is possible to change aspect ratio of video currently projected. If it is possible to change aspect ratio (YES in S1401), the process proceeds to S1402. In S1402, after the video editing unit 305 changes aspect ratio of video currently projected, the projecting unit 303, video forming controller 205, and the video forming unit 220 project the video, and the process finishes in S1404.

Alternatively, if the controller 300 determines that it is not possible to change aspect ratio (NO in S1401), the process proceeds to S1403. In S1403, after the UI creating unit 301 creates a UI that indicates that it is impossible to change aspect ratio, the projecting unit 303, the video forming controller 205, and the video forming unit 220 project the UI, and the process finishes in S1404.

FIGS. 15A, 15B, 15C, and 15D are diagrams illustrating examples of images projected by the image projector 110 in this embodiment.

An image 1500 is a display image of the video providing unit 120 projected by the image projector 110 onto a screen or the like. An image 1510 indicates a projected image in which a main menu screen 1512 is superimposed on the image 1500. An image 1520 indicates a projected image in which a main menu screen 1522 is superimposed on the image 1500.

The main menu screens 1512 and 1522 processed by the image projector 110 in this embodiment include a plurality of tabs, with switching between the main menu screen 1512 and 1522 accomplished by switching tabs.

An image 1530 includes a sub-menu screen projected by the image projector 110 on a screen or the like. The sub-menu screen 1532 is a menu screen displayed by choosing an item on the main menu 1512 and 1522. In this embodiment shown in FIGS. 15A, 15B, 15C, and 15D, the sub-menu screen 1532 on which a network is configured is displayed by choosing an item "network settings" on the main menu screen 1522.

Figures 16A, 16B:
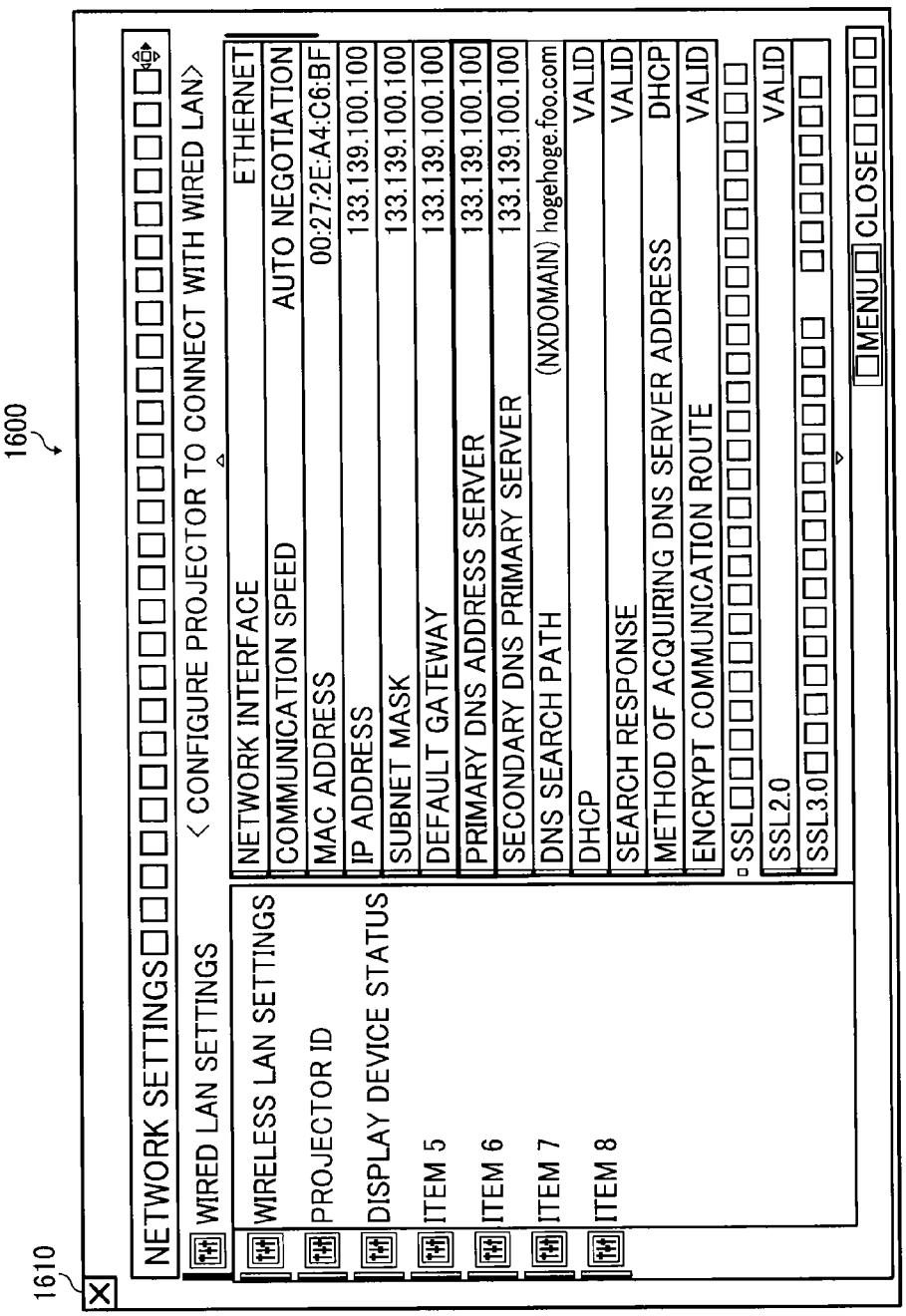
FIGS. 16A and 16B are diagrams illustrating another example of an image projected by the image projector as an embodiment of the present invention.

FIGS. 16A and 16B are diagrams illustrating another example of an image projected by the image projector 110.

An image 1600 is an image that includes a sub-menu screen projected by the image projector 110 on a projected device. The image 1600 includes a UI 1610 created by the UI creating unit 301 in the main board 200. The UI creating unit 301 can superimpose the UI 1610 on the sub-menu screen created by the UI creating unit 307 in the expansion board 210. A UI created by the UI creating unit 301 is not limited to the UI 1610 to close the sub-menu screen, and the UI creating unit 301 can also create a UI to notify the user that it is impossible to change aspect ratio and other UIs.

An image 1620 is a menu screen on which a user can switch the input type of the image projector 110. The image projector 110 switches the source of the video signal to the source of the video signal that corresponds to the input type chosen by the user on the menu screen. In this embodiment, the UI creating unit 301 in the main board 200 creates the menu screen.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image output apparatus, comprising:
   circuitry configured to:
   execute a process in response to a user request for operation;
   accept specification of a source for acquiring an image;
   output at least one of the image received from the source or another image generated by the image output apparatus;
   accept a request for operation that requests another process regarding output of the image received from the source;
   determine whether or not the source of the image to be processed in response to the accepted request for operation is different from a current source of a current image being output; and
   switch the current source of the current image to the source of the image to be processed in response to the request for operation based on a determination that the source of the image to be processed is different from the current source of the current image.

2. The image output apparatus according to claim 1, wherein the circuitry is configured to change aspect ratio of the image received from the source.

3. The image output apparatus according to claim 1, wherein the circuitry is configured to change quality of the image received from the source.

4. The image output apparatus according to claim 1, wherein the circuitry is configured to:
   generate the image output by the image output apparatus,
   generate a corresponding image that includes a message indicating that the process is not executable if the circuitry cannot execute the process in response to the request for operation, and
   not switch the current source if the circuitry cannot execute the process in response to the request for operation.

5. The image output apparatus according to claim 1, wherein the circuitry is configured to:
   execute the process in response to the user request for operation after the circuitry switches the current source of the current image to the source of the image, and
   switch the image to a previous image after the circuitry executes the process.

6. The image output apparatus according to claim 1, wherein the circuitry is configured to:
   store, in a memory, a data table that associates an input type of the image and the source of the image.

7. The image output apparatus according to claim 1, wherein the circuitry is configured to create a User Interface (UI).

8. The image output apparatus according to claim 7, wherein when it is determined that it is necessary to switch the current source of the current image, the circuitry is configured to close the UI.

9. An image output method, comprising:
   executing a process in response to a user request for operation;
   accepting specification of a source for acquiring an image;
   outputting at least one of the image received from the source or another image generated by an image output apparatus;
   accepting a request for operation that requests another process regarding output of the image received from the source;
   determining, using circuitry, whether or not the source of the image to be processed in response to the accepted request for operation is different from a current source of a current image being output; and
   switching, using the circuitry, the current source of the current image to the source of the image to be processed in response to the request for operation based on a determination that the source of the image to be processed is different from the current source of the current image.

10. A non-transitory computer-readable storage medium executing computer-readable instructions that, when executed by a computer, cause the computer to execute an image output method, the method comprising:
    executing a process in response to a user request for operation;
    accepting specification of a source for acquiring an image;
    outputting at least one of the image received from the source or another image generated by an image output apparatus;
    accepting a request for operation that requests another process regarding output of the image received from the source;
    determining whether or not the source of the image to be processed in response to the accepted request for operation is different from a current source of a current image being output; and
    switching the current source of the current image to the source of the image to be processed in response to the request for operation based on a determination that the source of the image to be processed is different from the current source of the current image.

* * * * *